(12) United States Patent
Morikazu

(10) Patent No.: US 7,368,682 B2
(45) Date of Patent: May 6, 2008

(54) PROCESSING APPARATUS

(75) Inventor: Hiroshi Morikazu, Tokyo (JP)

(73) Assignee: Disco Corporation, Tokyo (JP)

( * ) Notice: Subject to any disclaimer, the term of this patent is extended or adjusted under 35 U.S.C. 154(b) by 188 days.

(21) Appl. No.: 11/313,735

(22) Filed: Dec. 22, 2005

(65) Prior Publication Data

US 2006/0255025 A1 Nov. 16, 2006

(30) Foreign Application Priority Data

Dec. 28, 2004 (JP) ............... 2004-381022

(51) Int. Cl.
*B23K 26/00* (2006.01)
(52) U.S. Cl. .................... 219/121.82
(58) Field of Classification Search ........... 219/121.82
See application file for complete search history.

(56) References Cited

U.S. PATENT DOCUMENTS 4,906,011 A * 3/1990 Hiyamizu et al. .......... 279/3
6,580,054 B1 * 6/2003 Liu et al. ............... 219/121.68
2003/0196599 A1 * 10/2003 Sun et al. .................... 118/621
2003/0211246 A1 * 11/2003 Kydd et al. ................. 427/282
2005/0039779 A1 * 2/2005 Ohtsuka ...................... 134/30

FOREIGN PATENT DOCUMENTS

JP 3408805 3/2003
JP 2003-320466 11/2003

* cited by examiner

*Primary Examiner*—Geoffrey S. Evans
(74) *Attorney, Agent, or Firm*—Smith, Gambrell & Russell, LLP

(57) ABSTRACT

A processing apparatus contains a holding member for holding a workpiece, and a laser beam shining member for shining a laser beam at the workpiece held on the holding member. The holding member has a holding plate and the workpiece is placed on the holding plate. The holding plate is composed of a plate-shaped body formed from polychlorotrifluoroethylene, and a film formed from polytetrafluoroethylene is superposed on an upper surface of the plate-shaped body.

2 Claims, 2 Drawing Sheets

PROCESSING APPARATUS

FIELD OF THE INVENTION

This invention relates to a processing apparatus including a holding means for holding a workpiece, and a laser beam shining means for shining a laser beam at the workpiece held on the holding means.

DESCRIPTION OF THE PRIOR ART

As disclosed in Japanese Patent No. 3,408,805 and Japanese Patent Application Laid-Open No. 2003-320466, a processing apparatus utilizing a laser beam has been proposed as a processing apparatus for applying processing, such as cutting, to a workpiece such as a semiconductor wafer. Such a processing apparatus includes a holding means for holding a workpiece, and a laser beam shining means for shining a laser beam at the workpiece held on the holding means. The holding means has a porous holding plate, and the workpiece is placed on the holding plate and attracted under vacuum onto the holding plate. The holding plate is formed of a ceramic consisting essentially of aluminum oxide. When the workpiece vacuum-attracted onto the holding plate is to be cut along a cutting line, the holding means and the laser beam shining means are relatively moved along the cutting line and, during this movement, a laser beam is shone at the workpiece by the laser beam shining means.

The conventional processing apparatus utilizing a laser beam involves the following problems to be solved: Part of the laser beam shone at the workpiece placed on the holding plate of the holding means is also shone to the holding plate after passing through the workpiece. If the workpiece is a silicon wafer, for example, the silicon wafer tends to function as a lens for the laser beam shone, thereby focusing the laser beam onto a particular fine region of the holding plate. If the laser beam is shone, especially shone in a focused state, onto the holding plate, the surface of the holding plate is heated and damaged. If a protective resin film has been stuck to the back of the workpiece, namely, a surface of the workpiece in contact with the surface of the holding plate, the resin film may be melted and fused to the surface of the holding plate. During relative movement of the holding means and the laser beam shining means, moreover, a laser beam may spread beyond the outer edge of the workpiece on the holding plate, namely, may make a so-called overrun. In such a case, the laser beam is directly shone onto the holding plate, whereby the surface of the holding plate is heated and damaged.

SUMMARY OF THE INVENTION

The present invention has been accomplished in the light of the above-mentioned facts. It is a principal object of the present invention to provide a novel and improved processing apparatus in which even if a laser beam is shone onto the holding plate of the holding means, the surface of the holding plate is substantially neither heated nor damaged, or the heating of and damage to the holding plate are sufficiently suppressed.

The inventor diligently conducted studies, and has obtained the following findings: Fluorocarbon resins have very small absorption coefficients for a laser beam. Thus, if the holding plate of the holding means is formed from a fluorocarbon resin, the surface of the holding plate will substantially be neither heated nor damaged, or the heating of and damage to the surface of the holding plate will be sufficiently suppressed, even if a laser beam is shone onto the holding plate.

According to the present invention, there is provided, as a processing apparatus for attaining the above principal object, a processing apparatus comprising a holding means for holding a workpiece, and a laser beam shining means for shining a laser beam at the workpiece held on the holding means, and wherein the holding means has a holding plate formed from a fluorocarbon resin, and the workpiece is placed on the holding plate.

The holding plate is preferably formed from polychlorotrifluoroethylene (PCTFE) or polytetrafluoroethylene (PTFE). The holding plate, composed of a polychlorotrifluoroethylene plate-shaped body, and a polytetrafluoroethylene film superposed on the upper surface of the plate-shaped body, is particularly preferred. The film preferably has a thickness of 5 to 20 μm. The holding plate is advantageously porous.

DETAILED DESCRIPTION OF THE PREFERRED EMBODIMENTS

The preferred embodiments of a processing apparatus constructed in accordance with the present invention will now be described in further detail with reference to the accompanying drawings.

Figure 1:
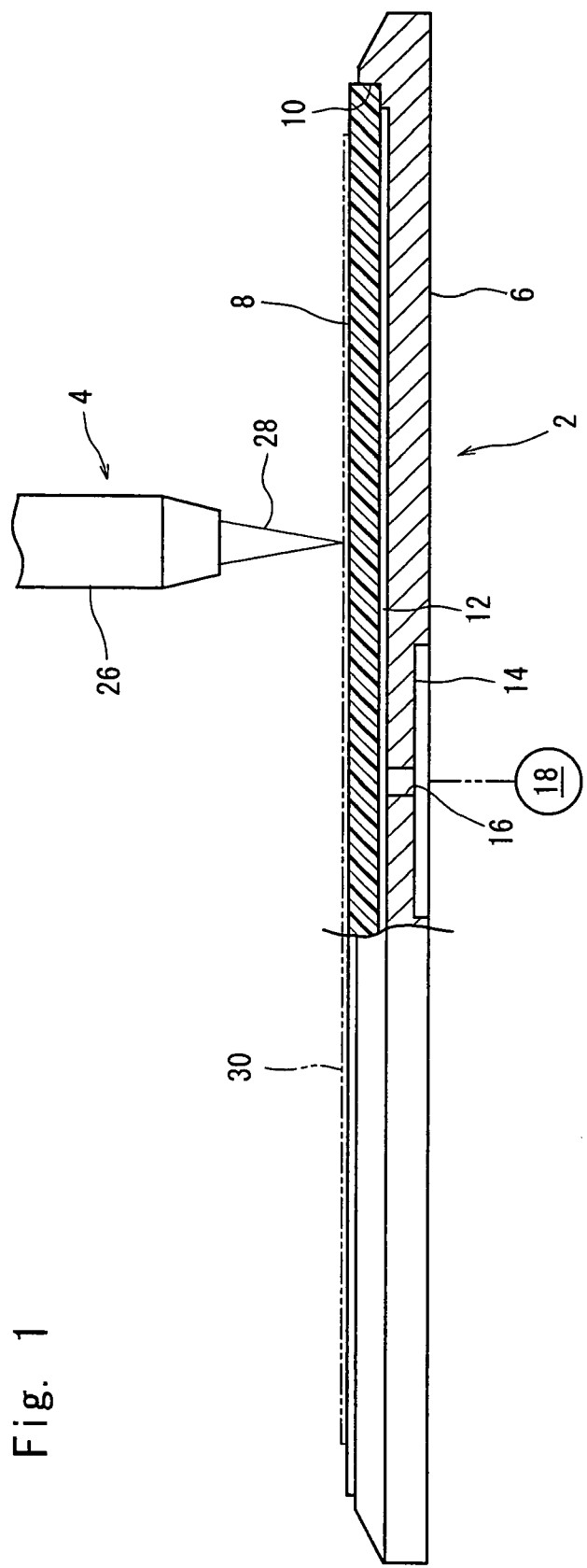
FIG. 1 is a schematic view showing, partly in section, essential constituent elements of a preferred embodiment of a processing apparatus constructed in accordance with the present invention.

FIG. 1 shows the essential constituent elements of the processing apparatus constructed in accordance with the present invention. This processing apparatus includes a holding means 2, and a laser beam shining means 4.

The holding means 2 is composed of a support board 6 disposed substantially horizontally, and a holding plate 8 fixed to the support board 6. The support board 6, which can be formed from a suitable metal such as aluminum or stainless steel, is generally disk-shaped, and its outer peripheral surface has a truncated conical upper portion and a cylindrical lower portion. A circular mounting concavity 10 is formed at the upper surface of the support board 6. A plurality of suction grooves 12 extending diametrically are formed at the bottom surface of the mounting concavity 10. The opposite ends of the suction grooves 12 are positioned somewhat radially inwardly of the outer peripheral edge of the mounting concavity 10. A suction concavity 14 is formed in the middle of the back of the support board 6. A communication hole 16, which brings the suction concavity 14 and the suction grooves 12 into communication, is formed at the center of the support board 6. The suction concavity 14 is connected to a suction means 18, which may be a vacuum pump, by a suitable communication means (not shown).

The holding plate 8 is in a circular shape, and its outer diameter is substantially the same as the inner diameter of the mounting concavity 10 formed in the support board 6. The holding plate 8 is disposed within the mounting concavity 10, and secured to the inner peripheral surface and bottom surface of the mounting concavity 10 by a suitable adhesive.

In the present invention, it is important that the holding plate 8 be formed from a fluorocarbon resin. As the preferred fluorocarbon resin, polychlorotrifluoroethylene (PCTFE) and polytetrafluoroethylene (PTFE) can be named. Instead of PCTFE and PTFE, a fluorocarbon resin, such as tetrafluoroethylene-hexafluoropropylene copolymer (FEP), tetrafluoroethylene-ethylene copolymer (ETFE), polyvinylidene fluoride (PVDF), or polyvinyl fluoride (PVF), can be used to form the holding plate 8. The holding plate 8 formed from the fluorocarbon resin is advantageously a porous material having open cells and, preferably, has a void content of the order of 20 to 50%.

Figure 2:
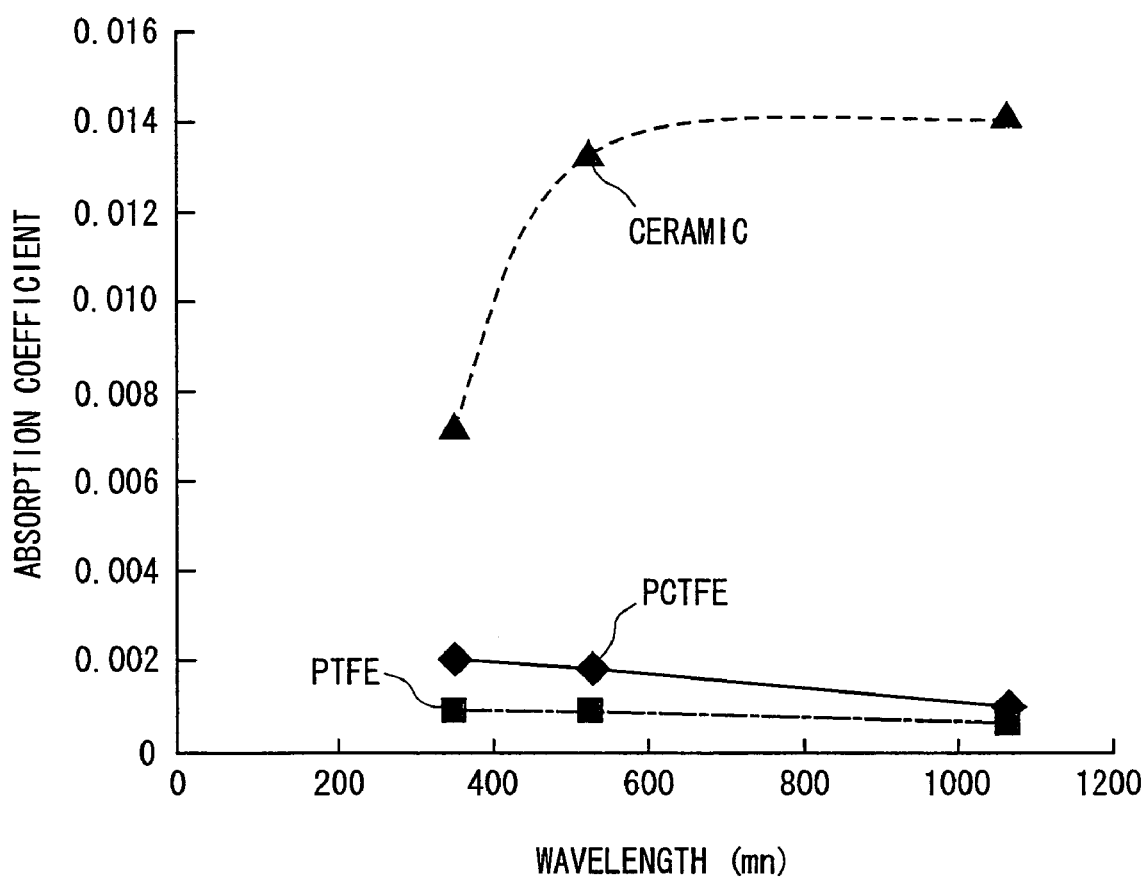
FIG. 2 is a graph showing the absorption coefficients of a ceramic consisting essentially of aluminum oxide, polychlorotrifluoroethylene, and polytetrafluoroethylene.

FIG. 2 is a graph showing the absorption coefficient of the ceramic used in the holding plate of the holding means in the conventional processing apparatus (i.e., a ceramic having an aluminum oxide content of about 92%), as well as the absorption coefficients of PCTFE and PTFE. The absorption coefficient of the ceramic in FIG. 2 was cited from HANDBOOK OF OPTICAL CONSTANTS OF SOLIDS which is published by ACADEMIC PRESS. The absorption coefficients of PCTFE and PTFE were obtained by forming a holding plate formed of PCTFE and a holding plate formed of PTFE, each having a void content of 28%, actually measuring the absorptances of these holding plates with the use of a spectrophotometer marketed under the trade name "U-3310" by Hitachi High-Technologies Corporation, and calculating the absorption coefficients from the following equation using the absorptances: $E=1-e^{-\alpha t}$ where Ee is the absorptance, $\alpha$ is the absorption coefficient, and t is the thickness of the holding plate.

By reference to FIG. 2, it is understood that the absorption coefficients of PCTFE and PTFE are much smaller than the absorption coefficient of the ceramic consisting essentially of aluminum oxide that has been used as the material for the holding plate. The absorption coefficient of PTFE is somewhat smaller than the absorption coefficient of PCTFE, but the suitability of PCTFE and PTFE should be judged in consideration of their machinability. That is, it is important that the flatness of the surface of the holding plate 8 be as small as possible. Compared with PCTFE, PTFE has a high melting point, and low rigidity, thus rendering surface grinding relatively difficult. According to the inventor's experience, if grinding is applied to the surface of the holding plate 6 formed of PCTFE, flatness of the order of 3 μm can be obtained. On the other hand, even when grinding is applied to the surface of the holding plate 6 formed of PTFE, flatness only of the order of 20 μm can be obtained. Under these circumstances, if the power density of the laser beam shone to the holding plate 6 is relatively high, and thus as small an absorptance as possible is desired for the holding plate 6 in order to avoid or suppress the heating of and damage to the surface of the holding plate 6, then it is desirable to form the holding plate 6 from PTFE. On the other hand, if it is desired to render the flatness of the surface of the holding plate 6 as small as possible for high precision processing of the workpiece, it is desirable to form the holding plate 6 from PCTFE.

Figure 3:
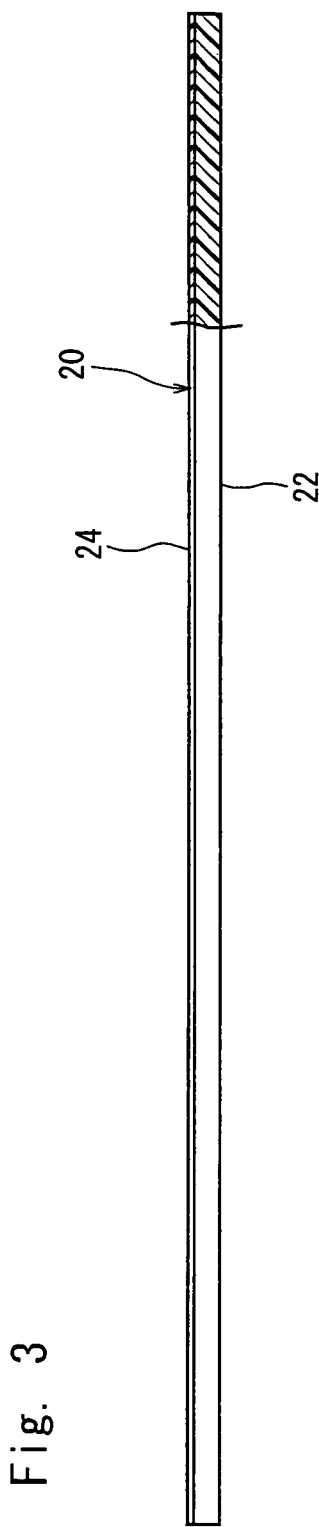
FIG. 3 is a side view showing, partly in section, a modification of a holding plate of a holding means in the processing apparatus of FIG. 1.

FIG. 3 shows a modification of the holding plate. A holding plate 20 shown in FIG. 3 is composed of a plate-shaped body 22 in the shape of a disk, and a film 24 superposed on the upper surface of the body 22. The body 22 is formed of PCTFE, and the film 24 is formed of PTFE. Preferably, the body 22 and the film 24 are both porous. The body 22 preferably has a thickness of the order of 3 to 10 mm, while the film 24 preferably has a thickness of the order of 5 to 20 μm. In the holding plate 20 shown in FIG. 3, the body 22 is formed from PCTFE. To compensate for the absorption coefficient of PCTFE that is not markedly small, the film 24 of PTFE having sufficient flatness is superposed on the surface of the body 22. If both of the body 22 and the film 24 are porous, suction through the holding plate 20 in a manner to be described later brings the film 24 into intimate contact with the surface of the body 22. Thus, the film 24 need not be adhered to the surface of the body 22, but the film 24 may simply be superposed on the surface of the body 22.

With further reference to FIG. 1, the laser beam shining means 4 includes a laser beam shining head 26 incorporating a focusing lens (not shown). Laser beam pulses from a laser beam oscillation means (not shown), which may be a YAG laser oscillator or a YVO4 laser oscillator, are supplied to the laser beam shining head 26, and laser beam pulses 28 are thrown from the laser beam shining head 26 in a substantially vertically downward direction.

To cut a workpiece 30 such as a semiconductor wafer, the workpiece 30 is placed on the holding plate 8 of the holding means 2, as shown in FIG. 1. The suction means 18 is actuated to suck the air via the holding plate 8 and the suction grooves 12, communication hole 16, and suction concavity 14 formed in the support board 6, whereby the workpiece 30 is vacuum-attracted onto the holding plate 8. The laser beam pulses 28 sent from the laser beam shining head 26 of the laser beam shining means 4 are focused onto a predetermined site of the workpiece 30. The holding means 2 and the laser beam shining head 26 are relatively moved in a horizontal direction along a predetermined cutting line, and the laser beam acts on the workpiece 30 along the cutting line.

Part of the laser beam 28 shone at the workpiece 30 passes through the workpiece 30, and hits the holding plate 8 as well. If the laser beam 28 overruns beyond the outer edge of the workpiece 30 as a result of the relative movement of the holding means 2 and the laser beam shining head 26, the laser beam 28 is directly shone onto the holding plate 8 or 20. With the processing apparatus constructed in accordance with the present invention, however, the holding plate 8 or 20 is formed from a fluorocarbon resin having a markedly small absorption coefficient. Hence, the heating of and damage to the surface of the holding plate 8 or 20 are avoided, or sufficiently suppressed.

While the preferred embodiments of the processing apparatus constructed according to the present invention have been described in detail by reference to the accompanying drawings, it is to be understood that the invention is not limited to such embodiments, but various changes and modifications may be made without departing from the scope of the invention.

What I claim is:

1. A processing apparatus comprising holding means for holding a workpiece, and laser beam shining means for shining a laser beam at the workpiece held on the holding means, wherein the holding means has a holding plate and the workpiece is placed on the holding plate, further wherein the holding plate is composed of a plate-shaped body formed from polychlorotrifluoroethylene, and a film formed from polytetrafluoroethylene is superposed on an upper surface of the plate-shaped body.

2. The processing apparatus according to claim 1, wherein the film has a thickness of 5 to 20 μm.

* * * * *